(12) United States Patent
Benedikt

(10) Patent No.: US 11,673,492 B2
(45) Date of Patent: Jun. 13, 2023

(54) CONTROL MECHANISM FOR LOCK PAWL

(71) Applicant: BRANO a.s., Hradec nad Moravici (CZ)

(72) Inventor: Rolny Benedikt, Chuchelná (CZ)

(73) Assignee: BRANO a. s., Hradec nad Moravici (CZ)

( * ) Notice: Subject to any disclaimer, the term of this patent is extended or adjusted under 35 U.S.C. 154(b) by 169 days.

(21) Appl. No.: 16/749,971

(22) Filed: Jan. 22, 2020

(65) Prior Publication Data
US 2020/0231071 A1 Jul. 23, 2020

(30) Foreign Application Priority Data

Jan. 22, 2019 (CZ) .................................. CZ2019-37

(51) Int. Cl.
*B60N 2/235* (2006.01)
*B60N 2/02* (2006.01)
*B60N 2/22* (2006.01)

(52) U.S. Cl.
CPC ......... *B60N 2/2354* (2013.01); *B60N 2/0232* (2013.01); *B60N 2/2227* (2013.01); *B60N 2/2231* (2013.01); *B60N 2002/0236* (2013.01)

(58) Field of Classification Search
CPC ...... B60N 2/08; B60N 2/0806; B60N 2/0831; B60N 2/0837; B60N 2/0843; B60N 2/085;

(Continued)

(56) References Cited

U.S. PATENT DOCUMENTS 4,225,177 A * 9/1980 Kluting ................ B60N 2/0232
188/69
8,584,542 B2 * 11/2013 Haraguchi ........... B60N 2/2231
74/55

(Continued)

FOREIGN PATENT DOCUMENTS

CZ          20032459 A3    4/2005
CZ           2004949 A3    4/2006

(Continued)

OTHER PUBLICATIONS

English language Abstract of CZ 20032459 A3 (Apr. 13, 2005).

(Continued)

*Primary Examiner* — Kyle J. Walraed-Sullivan
(74) *Attorney, Agent, or Firm* — Hershkovitz & Associates, PLLC; Abe Hershkovitz

(57) ABSTRACT

A control mechanism for a lock pawl comprises an electric motor mounted in a housing that is connected with the seat backrest and has an output shaft with a worm gear engaging with the spur gearing of a transmission gear rotary-mounted on a transmission pivot and having on its frontal surface an eccentric selector pivot for controlling the pawl of the lock, swing-mounted on a pawl pivot between a blocking position, in which the pawl blocks a rotary ratchet of the lock from releasing a catch eye connected with the car bodywork, and an unlocking position, in which the pawl releases the rotary ratchet to release the catch eye, the pawl having a radial selector arm, which in the blocking position of the pawl interferes with the circular trajectory of the selector pivot to enable the selector pivot to engage with the selector arm, whereas the pawl has a radial control arm.

10 Claims, 3 Drawing Sheets

(58) Field of Classification Search
CPC .... B60N 2/0856; B60N 2/0881; B60N 2/146; B60N 2/1685; B60N 2/1892; B60N 2/2245; B60N 2/2354; B60N 2/232; B60N 2/2358; B60N 2/2231; B60N 2002/0236
See application file for complete search history.

(56) References Cited

U.S. PATENT DOCUMENTS

| | | | | |
|---|---|---|---|---|
| 8,882,160 | B2* | 11/2014 | Kamata | B60N 2/366 292/216 |
| 9,500,012 | B2* | 11/2016 | Yamazaki | E05C 19/12 |
| 11,008,786 | B2* | 5/2021 | Im | E05B 81/16 |
| 11,021,083 | B2* | 6/2021 | Noguchi | B60N 2/20 |
| 2005/0023877 | A1 | 2/2005 | Vermeulen | |
| 2005/0212338 | A1* | 9/2005 | Muller | B60N 2/01583 297/336 |
| 2006/0082204 | A1* | 4/2006 | Zhang | B60N 2/01583 297/366 |
| 2006/0181087 | A1* | 8/2006 | Wrobel | B60N 2/20 292/216 |
| 2006/0208505 | A1* | 9/2006 | Christoffel | B60N 2/366 292/216 |
| 2008/0191535 | A1* | 8/2008 | Baumchen | E05B 83/16 297/367 R |
| 2009/0033138 | A1* | 2/2009 | Yamada | B60N 2/366 297/378.13 |
| 2009/0056393 | A1* | 3/2009 | Otsuka | B60N 2/3011 70/205 |
| 2010/0052394 | A1* | 3/2010 | Heeg | B60N 2/366 297/378.13 |
| 2010/0259061 | A1* | 10/2010 | Paing | B60N 2/01583 296/65.03 |
| 2011/0006576 | A1* | 1/2011 | Muller | B60N 2/366 297/378.13 |
| 2011/0006577 | A1* | 1/2011 | Muller | B60N 2/366 297/378.13 |
| 2011/0148164 | A1* | 6/2011 | Ooh | B60N 2/2358 297/344.1 |
| 2011/0169315 | A1* | 7/2011 | Heeg | B60N 2/2245 297/378.12 |
| 2012/0062015 | A1* | 3/2012 | Tanaka | B60N 2/366 297/463.1 |
| 2012/0193966 | A1* | 8/2012 | Matsuura | B60N 2/366 297/463.1 |
| 2012/0217370 | A1* | 8/2012 | Seigel | B60N 2/366 248/503.1 |
| 2012/0251231 | A1* | 10/2012 | Matsumoto | B60N 2/366 403/326 |
| 2013/0285429 | A1* | 10/2013 | Oh | B60N 2/366 297/367 P |
| 2013/0285430 | A1* | 10/2013 | Oh | B60N 2/2352 297/367 P |
| 2013/0328372 | A1* | 12/2013 | Suzumura | B60N 2/20 297/378.13 |
| 2014/0117698 | A1* | 5/2014 | Seto | B60N 2/366 296/65.03 |
| 2014/0145057 | A1* | 5/2014 | Sayama | B60N 2/01583 248/503.1 |
| 2014/0306507 | A1* | 10/2014 | Mueller | B60N 2/90 297/463.1 |
| 2014/0348578 | A1* | 11/2014 | Mueller | B60N 2/01541 403/322.4 |
| 2015/0054320 | A1* | 2/2015 | Handl | E05B 77/04 297/216.1 |
| 2015/0136934 | A1* | 5/2015 | Gordeenko | B60N 2/01508 248/503.1 |
| 2015/0218856 | A1* | 8/2015 | Sayama | E05B 79/08 292/96 |
| 2015/0306991 | A1* | 10/2015 | Ban | E05B 85/26 297/463.1 |
| 2015/0376919 | A1* | 12/2015 | Yamazaki | B60N 2/366 248/503.1 |
| 2016/0009198 | A1* | 1/2016 | Yaguchi | B60N 2/015 296/63 |
| 2016/0016493 | A1* | 1/2016 | Deppe | B60N 2/366 297/378.12 |
| 2016/0176319 | A1* | 6/2016 | Handl | B60N 2/2245 297/378.12 |
| 2016/0186468 | A1* | 6/2016 | Ilea | E05B 83/18 292/201 |
| 2016/0214506 | A1* | 7/2016 | Mueller | E05B 85/26 |
| 2017/0015219 | A1* | 1/2017 | Mosch | B60N 2/366 |
| 2017/0313210 | A1* | 11/2017 | Gonz | B60N 2/64 |
| 2017/0313211 | A1* | 11/2017 | Cristobal Aragon | B60N 2/20 |
| 2017/0327010 | A1* | 11/2017 | Noguchi | B60N 2/2358 |
| 2018/0043801 | A1* | 2/2018 | Lambertz | E05B 81/16 |
| 2018/0050611 | A1* | 2/2018 | Vedder | E05B 77/40 |
| 2018/0281622 | A1* | 10/2018 | Barzen | F16B 5/06 |
| 2018/0281628 | A1* | 10/2018 | Ikawa | B60N 2/085 |
| 2018/0290565 | A1* | 10/2018 | Tone | B60N 2/366 |
| 2019/0048617 | A1* | 2/2019 | Meyer | B60N 2/2245 |
| 2019/0143868 | A1* | 5/2019 | Dey | E05B 81/06 297/378.12 |
| 2019/0360242 | A1* | 11/2019 | Robertson | B60N 2/366 |
| 2020/0056409 | A1* | 2/2020 | Ban | B60N 2/015 |
| 2020/0086772 | A1* | 3/2020 | Madhu | B60N 2/366 |
| 2020/0130541 | A1* | 4/2020 | Kondo | B60N 2/206 |
| 2020/0223330 | A1* | 7/2020 | Zhuang | B60N 2/2245 |

FOREIGN PATENT DOCUMENTS

| | | | |
|---|---|---|---|
| CZ | 301333 B6 | 1/2010 | |
| DE | 19505779 A1 | 8/1996 | |
| DE | 19530726 A1 | 2/1997 | |
| DE | 19805388 A1 | 8/1999 | |
| DE | 102004010612 A1 | 9/2005 | |
| DE | 102005043227 B3 | 4/2007 | |
| DE | 102010007532 A1 | 8/2011 | |
| EP | 0960994 A2 | 12/1999 | |
| EP | 1225290 A2 | 7/2002 | |
| WO | WO-03010026 A1 * | 2/2003 | ......... B60N 2/0232 |
| WO | WO 2017116053 A1 | 7/2017 | |

OTHER PUBLICATIONS

Machine-generated English language translation of description and claims of CZ 2004949 A3 (Apr. 12, 2006).
English language Abstract of CZ 301333 B6 (Jan. 20, 2010).
English language Abstract of DE 19805388 A1 (Aug. 12, 1999).
English language Abstract of DE 19530726 A1 (Feb. 20, 1997).
English language Abstract of DE 19505779 A1 (Aug. 29, 1996).
English language Abstract of DE 102010007532 A1 (Aug. 11, 2011).
English language Abstract of DE 102004010612 A1 (Sep. 22, 2005).
English language Abstract of DE 102005043227 B3 (Apr. 5, 2007).
English language Abstract of EP 1225290 A2 (Jul. 24, 2002).
English language Abstract of EP 0960994 A2 (Dec. 1, 1999).
Search Report in related Czech Application No. PV 2019-37, dated Jul. 25, 2019.

* cited by examiner

CONTROL MECHANISM FOR LOCK PAWL

AREA OF TECHNOLOGY

The invention relates to a car seat lock.

STATE OF THE ART

Car seat locks are used for locking the backrest in an upright position and enable releasing and tilting the backrest from the locked upright position to a tilted, approximately horizontal position. The backrest lock body usually has a base plate connected firmly to the seat backrest. The base plate has a ratchet pivot to rotary mount a ratchet with a radial pawl arm, which provides a releasable engagement with a catch clamp connected with a solid part of the bodywork. In addition, the base plate has a pawl pivot to rotary mount a pawl with a radial pawl arm for engagement with a radial pawl arm. In the locked state of the lock in the upright backrest position, the catch clamp is fastened in a notch in the radial pawl arm, and the position of the radial ratchet arm is locked with a radial pawl arm in its locking position. Using a lever or other mechanism, the pawl can be turned against the force of the pawl spring from its locking position to the unlocking position; while turning, the radial pawl arm is released from its engagement with the radial ratchet arm, the ratchet is caused by the ratchet spring to turn from its locked position to the unlocked position and thus enables the release of the bodywork clamp from the notch in the radial ratchet arm and the tilting of the backrest. The base plate has a swing-mounted blocking support, the control arm of which engages with the radial pawl arm in the unlocked position of the lock and holds it in the unlocking position. By fastening the control arm against the radial pawl arm, the ratchet is released from its engagement with the radial pawl arm, the bodywork clamp is released and the backrest can be tilted by force as described above. When tilting the backrest back up into its upright position, the clamp connected with a solid part of the bodywork slides into a notch in the radial ratchet arm, the ratchet is turned by the force of the clamp against the force of the ratchet spring until the radial ratchet arm enters a force contact with the control arm and slides the control arm out of engagement with the radial pawl arm. After the control arm is slid out of engagement with the radial pawl arm, the pawl is forced by the pawl spring to turn back into its initial locking position, in which it becomes wedged in the radial ratchet arm. An electric motor and an appropriate transmission between the output shaft of the electric motor and the pawl are used at an advantage for turning the pawl from its locking position to its unlocking position. The electric motor is mounted in the lock housing and its output shaft has an output gear with a motional worm gear, engaging with the spur gearing of a transmission gear, mounted rotationally on a transmission pivot, the axis of which is parallel to the axes of the pawl pivot and the ratchet pivot. According to the state of the art, the transmission between the transmission gear and the pawl is provided by an axial transmission pivot, arranged eccentrically on the front surface of the transmission gear, and a selector arm protruding radially from the pawl and interfering with the trajectory of the selector pivot.

DE19805388 makes known a lock for a motorised vehicle door that includes a ratchet fitted with a radially running aperture for the insertion of a clamp connected with a solid bodywork part and swing-mounted between a locking and an unlocking position, the ratchet being turned in the locked position so that the clamp is locked in the ratchet aperture and the ratchet being turned in the unlocked position so that the clamp can be released from the ratchet aperture.

In addition, the lock includes a swing-mounted pawl fitted with a protrusion with a stop area, engaging with the ratchet in the locked position of the ratchet and blocking the ratchet in the locked position. Turning the pawn makes the pawn disengage from the ratchet, the ratchet turns into the unlocked position and releases the clamp from the ratchet aperture. The ratchet and the pawl and linked together via a spring, which provides a force contact between the ratchet and the pawl. To control the pawl position, there is an electric motor with an output shaft fitted with a motional worm gear, engaging with the spur gearing of the transmission gear, which has a selector pivot on its front surface. The loose end of the radial pawl arm has two lateral slides leading in a direction approximately tangential to the radial arm. The inner lateral slide has an entry surface arranged obliquely to the lateral slide. In the initial position, the position of the selector pivot is in immediately outside the entry surface of the inner lateral slide of the pawl. Once electric current is introduced to the electric motor, the selector gear with the selector pivot starts to turn counter-clockwise and the selector pivot makes force contact with the entry surface, causing the radial pawl arm to turn, while the pawl protrusion with the stop area releases the ratchet, which turns into its unlocked position and releases the clamp from the ratchet aperture. As a consequence of the shape arrangement of the slide groove between the outer lateral slide and the inner lateral slide, the selector pivot of the selector gear engages with the outer lateral slide of the radial pawl arm so that the force from the selector pivot runs almost perpendicular to the outer lateral slide. The outer lateral slide runs almost perpendicular to the radial direction and the force from the selector pivot runs almost radial to the pawl rotation axis. The movement of the selector pivot stops and causes the output shaft of the electric motor to stop. This causes a shock increase in the current load on the electric motor, which is detected and the current to the electric motor is stopped. Once the current to the electric motor is stopped, the force contact between the selector pivot and the outer lateral slide on the loose end of the radial pawl arm ceases, and the selector pivot no longer prevents the pawl turning back to its initial position. After the clamp returns into the aperture in the pawl and turns the ratchet back to its initial position, the ratchet disengages its radial arm from the pawl and the pawl turns to its initial position. However, the selector pivot remains in position behind the loose end of the radial pawl arm. On a new start of electric current to the electric motor, the selector pivot has to make almost a complete circular movement to again hit against the entry surface of the inner lateral slide at the loose end of the radial pawl arm and initiate a force contact on the loose end of the radial pawl arm. Thus, after the activation of the electric motor, the selector pivot first has to rotate into its initial activation position and enter a force contact with the entry surface of the inner lateral slide at the loose end of the radial pawl arm. However, the fast rotation of the selector gear results in an impact and a transitory jump of the selector pivot away from the entry surface, leading to an uncontrolled progress of the operation. The inner sliding walls of the inner lateral slide and the outer lateral slide, facing each other, are subject to wear as a consequence of the disadvantageous direction of the force of the selector pivot, and their surface has to be accurate and smooth and treated with a permanent operating lubricant. The operation of the lock may not be reliable also because the selector pivot is in an alternating force contact with both inner sliding walls and as such may easily become jammed between the inner sliding walls.

CZ PV 2003-2459 makes known an automobile lock installed in the car boot door and comprising a pawl and a ratchet. The pawl engages with the ratchet, which has an aperture for fastening of a clamp connected with a solid part of the bodywork. With the lock in the locked position, the pawl blocks the ratchet in a position where the clamp is fastened in the ratchet aperture. The lock has an electrical unlocking and locking facility using a small electric motor actuating the transmission gear. The transmission gear has a control cam and a blocking protrusion, both of which protrude axially from the frontal surface of the gear. The pawl has a radial unlocking arm with an axial blocking pivot, and the ratchet has a radial locking arm. During the unlocking, the control cam engages with the unlocking arm and turns the pawl so that the pawl disengages from the ratchet and the ratchet turns, by force of its own spring, to the open position, in which the clamp is released from the ratchet aperture. The gear continues rotating, and its rotary movement is stopped by the blocking protrusion touching the blocking pivot of the unlocking arm. During the locking, the gear rotates in the opposite direction compared to the unlocking, and the blocking protrusion engages with the locking arm and turns the ratchet against the force of its own spring to its closed position, in which the clamp is fastened in the ratchet aperture. At the same time, the pawl turns, by the force of its own spring, back to a position where it engages with the ratchet and blocks it in the closed position, in which the clamp is fastened in the ratchet aperture. For the unlocking and locking, the lock has two axial protrusions, arranged on the frontal surface of the transmission gear, the positions of which on the frontal surface have to match precisely the positions of the pawl and ratchet arms in both the locked and unlocked states. The locking and the turning of the ratchet results in friction between the pawl and ratchet surfaces, which causes wear and increases the loading of the driving electric motor. The pawl unlocking arm and the ratchet locking arm have to be manufactured with high precision, because their precise shape defines the accuracy of the surface contact and engagement between the pawl and the ratchet.

SUBJECT MATTER OF INVENTION

The objective of the invention is to eliminate disadvantages of the state of the art and provide car seats with a control mechanism for the lock pawl with electric actuation, which enables easy and reliable rotation of the pawl out of the locking position, in which the ratchet position is locked in engagement with the radial pawl arm, to the unlocking position, in which the ratchet is released from its engagement with the pawl, as well as securing fast and reliable stopping of the pawl in its unlocking position and stopping of the electric motor and all the components driven by the electric motor when the pawl reaches the unlocking position.

Disadvantages of the state of the art are significantly eliminated and the objective of the invention is met by the car seat lock, comprising an electric motor mounted in a housing connected with the car seat backrest and fitted with an output shaft with a worm gear engaging with the spur gearing of the transmission gear rotary-mounted on a transmission pivot and fitted on its frontal surface with an eccentric selector pin controlling the lock pawl, swing-mounted on the pawl pivot between the blocking position, in which the pawl blocks the rotary lock ratchet from releasing the catch eye connected to the car bodywork, and the unlocking position, in which the pawl releases the rotary ratchet to release the catch eye, according to the invention, the essence of which consists in the pawl having a radial arm, a selector arm and a radial control arm, arranged mutually angled, the selector arm in the pawl blocking position interfering with the circular trajectory of the selector pivot to allow engagement with the selector pivot the blocking arm, in the pawl unlocking position, interfering with the circular trajectory of the selector pivot to block the movement of the selector pivot.

According to an advantageous execution, the car seat lock according to the invention comprises an electric motor (1) mounted in a housing (4) that is connected with the seat backrest, the electric motor (1) having an output shaft (2) with a worm gear (3), the worm gear (3) engaging with the spur gearing (12) of a transmission gear (11), the transmission gear (11) rotary-mounted on a transmission pivot (13) and having on its frontal surface an eccentric selector pivot (15) for controlling the pawl (21) of the lock (5), the pawl (21) mounted on a pawl pivot (22) for swinging between a blocking position, in which the pawl (21) blocks a rotary ratchet (31) of the lock (5) from releasing a catch eye (35) connected with the car bodywork, and an unlocking position, in which the pawl (21) releases the rotary ratchet (31) to release the catch eye (35), the pawl (21) having a radial selector arm (24), the radial selector arm (24) in the blocking position of the pawl (21) interfering with the circular trajectory of the selector pivot (15) for engagement of the selector pivot (15) with the selector arm (24), the pawl (21) having a radial control arm (25), the control arm (25) angled against the radial selector arm (24) and interfering in the unlocking position of the pawl (21) with the circular trajectory of the selector pivot (15) to block the movement of the selector pivot (15) whereas for blocking movement of the selector pivot (15), the control arm (25) having a control protrusion (26) protruding in the tangential direction from the control arm (25) and having a stop area (27) blocking the movement of the selector pivot.

According to another advantageous execution the car seat lock according to the invention comprises an electric motor (1) mounted in a housing (4) that is connected with the seat backrest, the electric motor (1) having an output shaft (2) with a worm gear (3), the worm gear (3) engaging with the spur gearing (12) of a transmission gear (11), the transmission gear (11) rotary-mounted on a transmission pivot (13) and having on its frontal surface an eccentric selector pivot (15) for controlling the pawl (21) of the lock (5), the pawl (21) mounted on a pawl pivot (22) for swinging between a blocking position, in which the pawl (21) blocks a rotary ratchet (31) of the lock (5) from releasing a catch eye (35) connected with the car bodywork, and an unlocking position, in which the pawl (21) releases the rotary ratchet (31) to release the catch eye (35), the pawl (21) having a radial selector arm (24), the radial selector arm (24) in the blocking position of the pawl (21) interfering with the circular trajectory of the selector pivot (15) for engagement of the selector pivot (15) with the selector arm (24), the pawl (21) having a radial control arm (25), the control arm (25) angled against the radial selector arm (24) and interfering in the unlocking position of the pawl (21) with the circular trajectory of the selector pivot (15) to block the movement of the selector pivot (15), the pawl (21) comprising a selector sleeve (42) connected with a selector arm (24)]] and a control sleeve (43) connected with a control arm (25), both the selector sleeve (42) and the control sleeve (43) being rotary-mounted side by side on the pawl pivot (22) and linked together with a link torsion spring (41).

According to another advantageous execution the car seat lock according to the invention, pawl comprises an electric motor (1) mounted in a housing (4) that is connected with the seat backrest, the electric motor (1) having an output shaft (2) with a worm gear (3), the worm gear (3) engaging with the spur gearing (12) of a transmission gear (11), the transmission gear (11) rotary-mounted on a transmission pivot (13) and having on its frontal surface an eccentric selector pivot (15) for controlling the pawl (21) of the lock (5), the pawl (21) mounted on a pawl pivot (22) for swinging between a blocking position, in which the pawl (21) blocks a rotary ratchet (31) of the lock (5) from releasing a catch eye (35) connected with the car bodywork, and an unlocking position, in which the pawl (21) releases the rotary ratchet (31) to release the catch eye (35), the pawl (21) having a radial selector arm (24), the radial selector arm (24) in the blocking position of the pawl (21) interfering with the circular trajectory of the selector pivot (15) for engagement of the selector pivot (15) with the selector arm (24), the pawl (21) having a radial control arm (25), the control arm (25) angled against the radial selector arm (24) and interfering in the unlocking position of the pawl (21) with the circular trajectory of the selector pivot (15) to block the movement of the selector pivot (15), the pawl (21) comprising a selector sleeve (42) with a selector arm (24) and a control sleeve (43) with a control arm (25), both the selector sleeve (42) and the control sleeve (43) being rotary-mounted side by side on the pawl pivot (22) and linked together with a link torsion spring (41), whereas the angular distance between the control sleeve (43) and the selector sleeve (42) is adjustable.

The advantages of the car seat lock according to the invention consist in both easy and reliable control of the pawl movement, in the stopping of the gear driven by the electric motor always in the same position, in the fast and reliable stopping of the electric motor and all the components driven by the electric motor when the pawl reaches the unlocking position. Another advantage of the car seat lock according to the invention consists in the fact that both the unlocking and the locking make use of a single selector pivot arranged on the frontal surface of the transmission gear, which engages with a pawl arm.

OVERVIEW OF FIGURES IN THE DRAWINGS

The car seat lock according to the invention is explained using drawings, wherein FIG. 1 shows a section through the car seat lock in the pawl blocking position;

Figure 1:
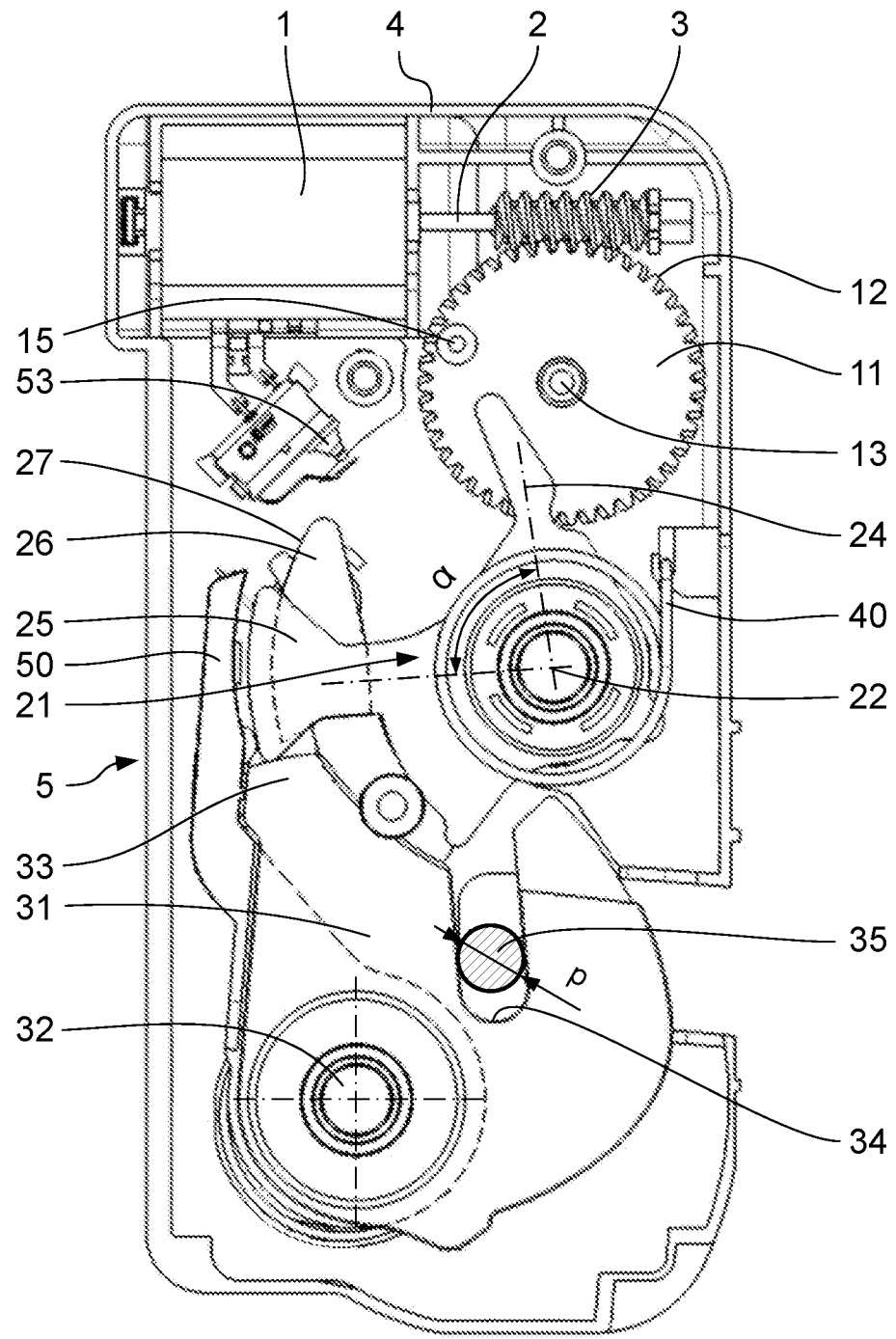

LIST OF EXPLANATORY SYMBOLS 1 electric motor
2 output shaft
3 worm gear
4 housing
5 lock
11 transmission gear
12 spur gearing
13 transmission pivot
15 selector pivot
21 pawl
22 pawl pivot
23 pawl spring
24 selector arm
25 control arm
26 control protrusion
27 stop area (for selector pin 15)
28 stop area (for blocking element 50)
31 ratchet
32 ratchet pivot
33 radial arm
34 notch
35 catch eye
36 stop
40 pawl torsion spring
41 link torsion spring
41a first end
41b second end
42 selector sleeve
43 control sleeve
50 blocking arm
51 auxiliary pawl
52 (auxiliary pawl) arm
53 electric switch Example Embodiment of the Car Seat Lock According to the Invention According to FIG. 1, the electric motor (1) of the car seat lock is mounted in a housing (4) connected with a seat backrest. The electric motor (1) has an output shaft (2) with a worm gear (3), which engages with the spur gearing (12) of the transmission gear (11), rotary-mounted on the transmission pivot (13). The transmission gear (11) has on its frontal surface an eccentric selector pivot (15) to control the pawl (21) of the lock (5). The pawl (21) is swing-mounted on the pawl pivot (22) between a blocking position, in which the pawl (21) blocks the rotary ratchet (31) of the lock (5) against releasing the catch eye (35) connected with the car bodywork, and an unlocking position, in which the pawl (21) releases the rotary ratchet (31) to release the catch eye (35). The ratchet (31) is rotary-mounted in the housing (4) on the ratchet pivot (32). The catch eye (35) interferes, in the specified position of the ratchet (31), with the U-shaped notch (34), which runs at least partly radially. The blocking arm (50) is also rotary-mounted on the ratchet pivot (32). The pawl 21 comprises a radial arm 25, which according to FIG. 1 engages with the radial arm of the ratchet 31. As a consequence of the force contact between the radial arm 25 of the pawl 21 and the radial arm of the ratchet 31, the pawl 21 blocks the ratchet 31 in the locked position so that the catch eye 35 cannot be released. The housing (4) also contains an electric switch (53) with a contact element, which is ready to indicate contact of the control arm (25) of the pawl (21) in the position into which the pawl (21) is moved according to FIG. 2 below. The pawl (21) has a radial selector arm (24) and a radial control arm (25), which are angled against each other and interfere, in a certain position of the pawl (21), with the circular trajectory of the selector pivot (15). According to FIG. 1, the pawl (21) is in the blocking position. In the blocking position of the pawl (21), the selector arm (24) of the pawl (21) interferes with the circular trajectory of the selector pivot (15) to make the selector pivot (15) engage with the selector arm (24). The position of the selector pivot (15) according to FIG. 1 is the initial position, in which the car seat lock is when the seat backrest is lifted and locked. After the unlocking of the lock (5) is activated by bringing electric current to the electric motor (1), the transmission worm gear (3) and the spur gearing (2) make the transmission gear (11) with the selector pivot (15) rotate counter clockwise, the selector pivot (15) hits the selector arm (24) and its force contact with the selector arm makes the selector pivot (15) start turning the pawl (21) against the force of the torsion pawl spring (40) clockwise into the unlocking position, shown in FIG. 2.

Figure 2:
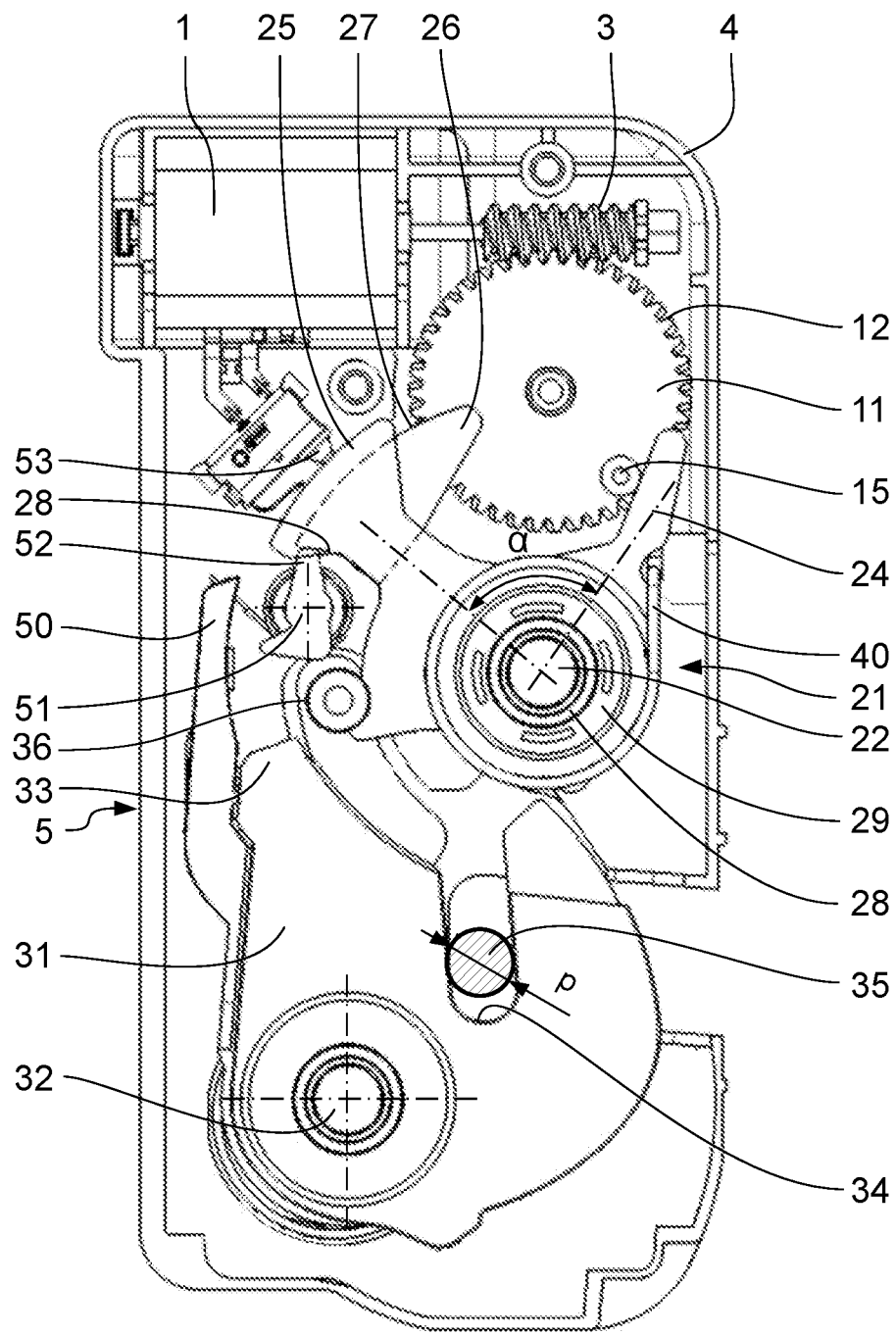
FIG. 2 shows a section through the car seat lock in the pawl unlocking position during engagement of the selector pivot with the selector arm.
Figure 3:
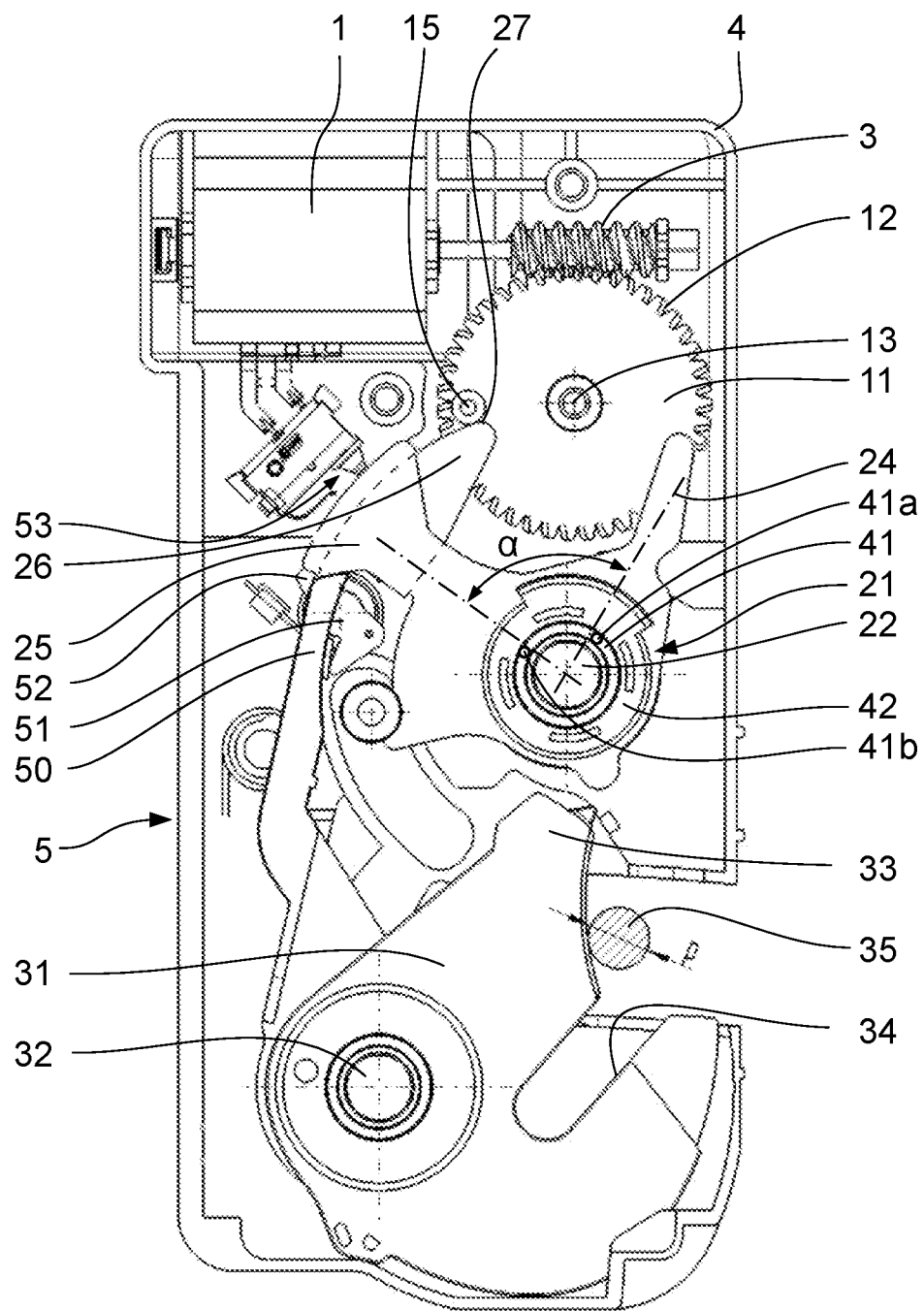
FIG. 3 shows a section through the car seat lock in the pawl unlocking position during engagement of the control protrusion of the control arm or the blocking arm with the selector pivot, with the catch eye released from the notch.

According to FIG. 2, the selector pivot (15) has, by force contact with the selector arm (24), turned the pawl (21) clockwise into the unlocking position. The pawl (21) has a radial selector arm (24) and a radial control arm (25), which are angled against each other under the angle α. The pawl (21) is in the unlocking position, in which the control arm (25) of the pawl (21) is not in force contact with the ratchet (31). The opposite side of control arm (25) from selector arm (24) is configured to engage with stop (36) of radial arm (33) to move it past radial arm (33) so that the ratchet (31) is free to rotate clockwise around the pivot (32) to release the catch eye (35) from the notch (34), as shown in FIG. 3, and to enable tilting of the seat backrest down from its upright position. In the unlocking position, the pawl (21) according to FIG. 1 is held by an auxiliary pawl (51), rotary-mounted in the housing (4) against the force of the torsion spring. The auxiliary pawl 51 has a radial arm (52), which touches the control arm (25) or the control protrusion (26) by force contact and exerts a force in the tangential direction on the pawl (21), blocking the pawl (21) against its counter clockwise movement, thus preventing the pawl (21) from returning to the blocking position. According to FIG. 2, the return to the blocking position can be prevented by the loose end of the blocking arm (50) after the ratchet (31) has titled clockwise and released the catch eye (35) from the notch (34). After the tilting of the ratchet (31), the blocking arm (50) turns clockwise by action of its own torsion spring and its loose end is fastened, instead of the auxiliary pawl (51), in the stop area (28) of the control arm (25). The loose end of the control arm (25) has activated a contact of the electric switch (53), which sends a signal and information about the pawl (21) reaching its unlocking position, i.e., information about the seat backrest becoming unlocked. To block the movement of the selector pivot (15), the control arm (25) has a control protrusion (26), protruding in the tangential direction from the control arm (25) and having a stop area (27). In the unlocking position of the pawl (21), the control arm (25) of the pawl (21) interferes, with its control protrusion (26), in the circular trajectory of the selector pivot (15). The transmission gear (11), driven via the transmission elements shown by the electric motor (1), continues rotating counter clockwise and the selector pivot (15), by its force action on the selector arm (24), turns the pawl (21) farther against the force of the pawl spring (40), the selector pivot (15) runs past the selector arm (24), disengages from the selector arm (24) and continues rotating along its circular trajectory. After disengaging from the selector arm (24), the selector pivot (15) stops exerting force on the selector arm (24). The pawl (21) is under the force action of the pawl torsion spring (40), but does not return counter clockwise to the blocking position according to FIG. 1, because that is prevented by the arm (52) of the auxiliary pawl (51) or the loose end of the blocking arm (50), which exerts a force on the stop area (28) of the pawl. After disengaging from the selector arm (24), the selector pivot (15) continues rotating along its circular trajectory until it hits the stop area (27) for stopping the selector pivot (15), as shown in FIG. 3.

In FIG. 3, the selector pivot (15) of the transmission gear 11 is shown stopped at the stop area (27) of the control protrusion (26) of the control arm (25), when the rotation of the transmission gear (11) stops. As a consequence of the stopping, the current load on the electric motor (1) increases sharply and the current supply to the electric motor (1) is deactivated. The selector pivot (15) stops exerting the force on the stop area (27). When the backrest is lifted from the tilted to the upright position, the catch eye (35) moves in a direction tangential to the ratchet pivot (32) and turns the ratchet (31) counter clockwise by force, making it enter in a retrograde movement the position shown in FIG. 1 and thus locking the lock (5). During this retrograde movement, the ratchet (31) disengages, by a force action on the blocking arm (50), the blocking arm (50) or the auxiliary pawl (51) from the stop area (28) of the control arm (25), thus releasing the pawl (21) and allowing its retrograde movement into the blocking position. During the retrograde movement of the pawl (21), the control protrusion (26) disengages from the selector pivot (15), but the selector pivot (15) still remains in the position according to FIG. 3, until the next activation of the electric motor. The position of the selector pivot (15) according to FIG. 3 is the initial position of the selector pivot (15) for the unlocking the lock (5). According to FIG. 3, the pawl (21) can be made of two pieces and comprise selector sleeve (42) and a control sleeve (43), between which there can be a link torsion spring (41), which links the selector sleeve (42) and the control sleeve (43). The selector sleeve (42) and the control sleeve (43) are rotary-mounted side by side on a single pawl pivot (22). The selector sleeve (42) has a selector arm (24) and the control sleeve (43) has a control arm (25). This alternative arrangement can be used to eliminate noisy impacts of parts and achieve a softer stopping effect. At an advantage, the angular distance between the control sleeve (43) and the selector sleeve (42) can be adjustable.

The invention claimed is:

1. A car seat lock, comprising an electric motor mounted in a housing that is connected with a seat backrest, the electric motor having an output shaft with a worm gear, the worm gear engaging with a spur gearing of a transmission gear, the transmission gear being rotatably mounted on a transmission pivot, the transmission gear having on a frontal surface an eccentric selector pivot for controlling a pawl of the car seat lock, the pawl mounted on a pawl pivot for swinging between a blocking position, in which the pawl blocks a rotary ratchet of the car seat lock from releasing a catch eye connected with car bodywork, and an unlocking position, in which the pawl releases the rotary ratchet to release the catch eye, the pawl having a radial selector arm, the radial selector arm in the blocking position of the pawl interfering with a circular trajectory of the eccentric selector pivot for engagement of the eccentric selector pivot with the radial selector arm, the pawl having a radial control arm, the radial control arm angled against the radial selector arm and interfering in the unlocking position of the pawl with the circular trajectory of the eccentric selector pivot to block movement of the selector pivot, the pawl comprising a selector sleeve with a radial selector arm and a control sleeve with a radial control arm, both the selector sleeve and the control sleeve being mounted rotatably side by side on the pawl pivot and linked together with a link torsion spring.

2. A car seat lock, comprising an electric motor mounted in a housing that is connected with a seat backrest, the electric motor having an output shaft with a worm gear, the worm gear engaging with a spur gearing of a transmission gear, the transmission gear being mounted rotatably on a transmission pivot, the transmission gear having on a frontal surface an eccentric selector pivot arranged eccentrically for controlling a pawl of the car seat lock, the pawl mounted on a pawl pivot for swinging between a blocking position, in which the pawl blocks a rotary ratchet of the car seat lock from releasing a catch eye connected with car bodywork, and an unlocking position, in which the pawl releases the rotary ratchet to release the catch eye, the pawl having a radial selector arm, the radial selector arm in the blocking position of the pawl interfering with a circular trajectory of the eccentric selector pivot for engagement of the eccentric selector pivot with the radial selector arm, the pawl having a radial control arm, the radial control arm angled against the radial selector arm and interfering in the unlocking position of the pawl with the circular trajectory of the eccentric selector pivot to block movement of the selector pivot, the pawl comprising a selector sleeve with a selector arm and a control sleeve with a control arm, both the selector sleeve and the control sleeve being mounted rotatably side by side on the pawl pivot and linked together with a link torsion spring, wherein an angular distance between the control sleeve and the selector sleeve is adjustable.

3. A car seat lock comprising an electric motor mounted in a housing that is connected with a seat backrest and having an output shaft with a worm gear engaging with a circumferential gearing of a transmission gear rotary-mounted on a transmission pivot, the transmission gear having on a frontal surface a selector pivot activating a pawl, swing-mounted on a pawl pivot between a blocking position, in which the pawl blocks a rotary ratchet from releasing a catch eye connected with car bodywork, and an unlocking position in which the pawl releases the rotary ratchet to release the catch eye, wherein the pawl has a radial arm and a blocking arm, the radial arm in the blocking position of the pawl interfering with a circular trajectory of the selector pivot to allow engagement with the selector pivot, and the blocking arm in the unlocking position of the pawl interfering with a circular trajectory of the selector pivot to block the movement of the selector pivot, wherein the blocking arm has a blocking protrusion protruding in a tangential direction from the blocking arm and has a stop area blocking movement of the selector pivot, and where the pawl comprises a selector sleeve with a selector arm and a control sleeve with a control arm, both the selector sleeve and the control sleeve being mounted rotatably side by side on the pawl pivot and linked together with a link torsion spring.

4. A car seat lock, comprising an electric motor mounted in a housing that is connected with a seat backrest, the electric motor having an output shaft with a worm gear, the worm gear engaging with a spur gearing of a transmission gear, the transmission gear being rotatably mounted on a transmission pivot, the transmission gear having on a frontal surface an eccentric selector pivot for controlling a pawl of the car seat lock, the pawl mounted on a pawl pivot for swinging between a blocking position, in which the pawl blocks a rotary ratchet of the car seat lock from releasing a catch eye connected with a car bodywork, and an unlocking position, in which the pawl releases the rotary ratchet to release the catch eye,
  the pawl having a radial selector arm, the radial selector arm in the blocking position of the pawl interfering with a circular trajectory of the eccentric selector pivot for engagement of the eccentric selector pivot with the radial selector arm,
  the pawl having further a radial control arm, the radial control arm angled against the radial selector arm and interfering in the unlocking position of the pawl with the circular trajectory of the eccentric selector pivot to block movement of the selector pivot, and
  a blocking arm is rotatively mounted in the housing, the blocking arm having an end, the end being fastened in a stop area of the radial control arm to prevent the return of the pawl from the unlocking position into the blocking position after the ratchet is tilted for releasing the catch eye, and
  the blocking arm is disengaged by the ratchet from the stop area of the radial control arm for releasing the pawl into the blocking position.

5. The car seat lock according to claim 4, wherein the blocking arm has a blocking protrusion protruding in a tangential direction from the blocking arm and has a stop area blocking movement of the selector pivot.

6. The car seat lock according to claim 4, wherein the pawl comprises a control sleeve connected with the radial selector arm and a blocker sleeve connected with the blocking arm, both the control sleeve and the blocker sleeve being rotatively-mounted side by side on the pawl pivot and linked together with a link torsion spring.

7. The car seat lock according to claim 5, wherein the pawl comprises a control sleeve connected with the radial selector arm and a blocker sleeve connected with a blocking arm, both the control sleeve and the blocker sleeve being rotatively-mounted side by side on the pawl pivot and linked together with a link torsion spring.

8. The car seat lock according to claim 6, wherein an angular distance between the blocker sleeve and the control sleeve is adjustable.

9. The car seat lock according to claim 7, wherein an angular distance between the blocker sleeve and the control sleeve is adjustable.

10. The car seat lock according to claim 4, wherein the blocking arm is rotatably mounted on a ratchet pivot.

* * * * *